United States Patent
Joshi et al.

(10) Patent No.: US 9,965,446 B1
(45) Date of Patent: May 8, 2018

(54) FORMATTING A CONTENT ITEM HAVING A SCALABLE OBJECT

(71) Applicant: Amazon Technologies, Inc., Reno, NV (US)

(72) Inventors: Lokesh Joshi, Mercer Island, WA (US); Eric Allen Menninga, Seattle, WA (US); Jonathan Tinkou Chen, Seattle, WA (US); Aby Thomas Angilivelil, Issaquah, WA (US); Joel Riendeau, Seattle, WA (US); Christopher Allen Suver, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 266 days.

(21) Appl. No.: 13/946,880

(22) Filed: Jul. 19, 2013

(51) Int. Cl.
    *G06F 17/21* (2006.01)

(52) U.S. Cl.
    CPC .................. *G06F 17/212* (2013.01)

(58) Field of Classification Search
    CPC .................................................. G06F 17/2247
    USPC ............................................................. 715/203
    See application file for complete search history.

(56) References Cited

U.S. PATENT DOCUMENTS

| | | | | |
|---|---|---|---|---|
| 6,295,072 B1 * | 9/2001 | Pon | ........................ | G06T 11/203 345/442 |
| 6,674,435 B1 * | 1/2004 | Payne | .................... | G06F 17/175 345/440 |
| 6,704,024 B2 * | 3/2004 | Robotham | ................ | G06F 3/14 345/581 |
| 8,068,106 B1 * | 11/2011 | Yhann | ..................... | G06T 11/20 345/442 |
| 8,379,025 B1 * | 2/2013 | Carr | ....................... | G06T 11/203 345/419 |
| 8,495,098 B1 * | 7/2013 | Kern | ................... | G06F 17/30914 707/793 |
| 8,595,186 B1 * | 11/2013 | Mandyam | ................. | G06F 8/38 707/632 |
| 2003/0001864 A1 * | 1/2003 | Charpentier | .............. | G06F 3/14 345/619 |

(Continued)

OTHER PUBLICATIONS

Stephen Buswell et al., OpenMath—Guidelines for Tool Developers, Version 2, The OpenMath Thematic Network, Sep. 2003, p. 4.*

(Continued)

*Primary Examiner* — Frank D Mills
(74) *Attorney, Agent, or Firm* — Lee & Hayes, PLLC

(57) ABSTRACT

In some examples, a computing device may receive a content item for formatting, the content item including at least one scalable object to be rendered with a portion of content during presentation of the content item on an electronic device. The computing device may convert a complex shape element in the scalable object to at least one path command that includes a sequence of one or more paths that correspond to the complex shape element. The computing device may format the at least one path command for parsing by a content parser of the electronic device. Further, the computing device may associate the at least one path command with the portion of content so that the at least one path command will be rendered in place of rendering information for the scalable object that was originally included with the content item.

17 Claims, 8 Drawing Sheets

(56) References Cited

U.S. PATENT DOCUMENTS

| | | | | |
|---|---|---|---|---|
| 2003/0016233 A1* | 1/2003 | Charpentier | ............... | G06F 3/14 345/619 |
| 2004/0205547 A1* | 10/2004 | Feldt | ...................... | G06F 17/241 715/201 |
| 2005/0238244 A1* | 10/2005 | Uzawa | ...................... | G06T 9/20 382/242 |
| 2006/0005114 A1* | 1/2006 | Williamson | ......... | G06F 17/2247 715/211 |
| 2006/0112167 A1* | 5/2006 | Steele | ..................... | H04L 29/06 709/206 |
| 2006/0256115 A1* | 11/2006 | Cao | ......................... | G06T 11/20 345/442 |
| 2007/0089048 A1* | 4/2007 | Lacey | ................... | G06F 9/4443 715/234 |
| 2007/0242082 A1* | 10/2007 | Lathrop | ............ | G06F 17/30271 345/619 |
| 2008/0052616 A1* | 2/2008 | Kano | .................. | G06F 17/2247 715/236 |
| 2008/0077854 A1* | 3/2008 | Alabi | .................... | G06F 17/215 715/236 |
| 2008/0082907 A1* | 4/2008 | Sorotokin | ............. | G06F 17/212 715/210 |
| 2008/0082911 A1* | 4/2008 | Sorotokin | ............. | G06F 17/218 715/236 |
| 2008/0120355 A1* | 5/2008 | Alabi | .................... | G06F 17/215 708/270 |
| 2008/0134019 A1* | 6/2008 | Wake | .................... | G06F 17/227 715/239 |
| 2008/0201695 A1* | 8/2008 | Zhou | ............................. | 717/136 |
| 2009/0317011 A1* | 12/2009 | Axelsson | ................ | G06T 11/60 382/242 |
| 2010/0100807 A1* | 4/2010 | Matsumoto | ......... | G06F 17/2247 715/234 |
| 2010/0172594 A1* | 7/2010 | Priddle et al. | ................ | 382/253 |
| 2010/0322527 A1* | 12/2010 | Fablet | ................. | G06F 17/2252 382/232 |
| 2013/0174017 A1* | 7/2013 | Richardson | ............ | G06F 17/21 715/234 |
| 2013/0188875 A1* | 7/2013 | Sesum | .................. | G06F 17/211 382/198 |
| 2014/0164915 A1* | 6/2014 | Liu | ........................ | G06F 17/211 715/249 |
| 2015/0007021 A1* | 1/2015 | Antipa | ................ | G06F 17/2247 715/235 |

OTHER PUBLICATIONS

Ian H. Witten et al., Importing Documents and Metadata into Digital Libraries, Springer-Verlag, 2002, p. 394, 404.*

Rod Stephens, Visual Basic 2012 Programmers Reference, Wrox, 2012, Ch. 11, XAML Features.*

Bruhn et al., "Displaying mathematics in a web browser using MathML and SVG." In Proceedings of the 2nd annual conference on Mid-south college computing, pp. 97-106. Mid-South College Computing Conference, 2004.*

Sagar, Musbah Shahop. "An SVG browser for XML languages." In Theory and Practice of Computer Graphics, 2003. Proceedings, pp. 1-7. IEEE, 2003.*

Ibáñez, María Blanca, and Carlos Delgado Kloos. "Dynamic customization of etextbooks." Ceur Workshop Proceedings, 2012. (Year: 2012).*

* cited by examiner

FORMATTING A CONTENT ITEM HAVING A SCALABLE OBJECT

BACKGROUND

The continued proliferation of digital content items has led to an increase in the availability of such content items, as well as an increase in the availability of electronic devices and applications used for consuming these content items. For instance, users may consume content items, such as electronic books (eBooks) and other types of content items that include text and/or images, on an assortment of electronic devices. As the number of content items and devices for consuming content items continues to increase, users are ever more interested in enhancing their experiences while acquiring and consuming these content items.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
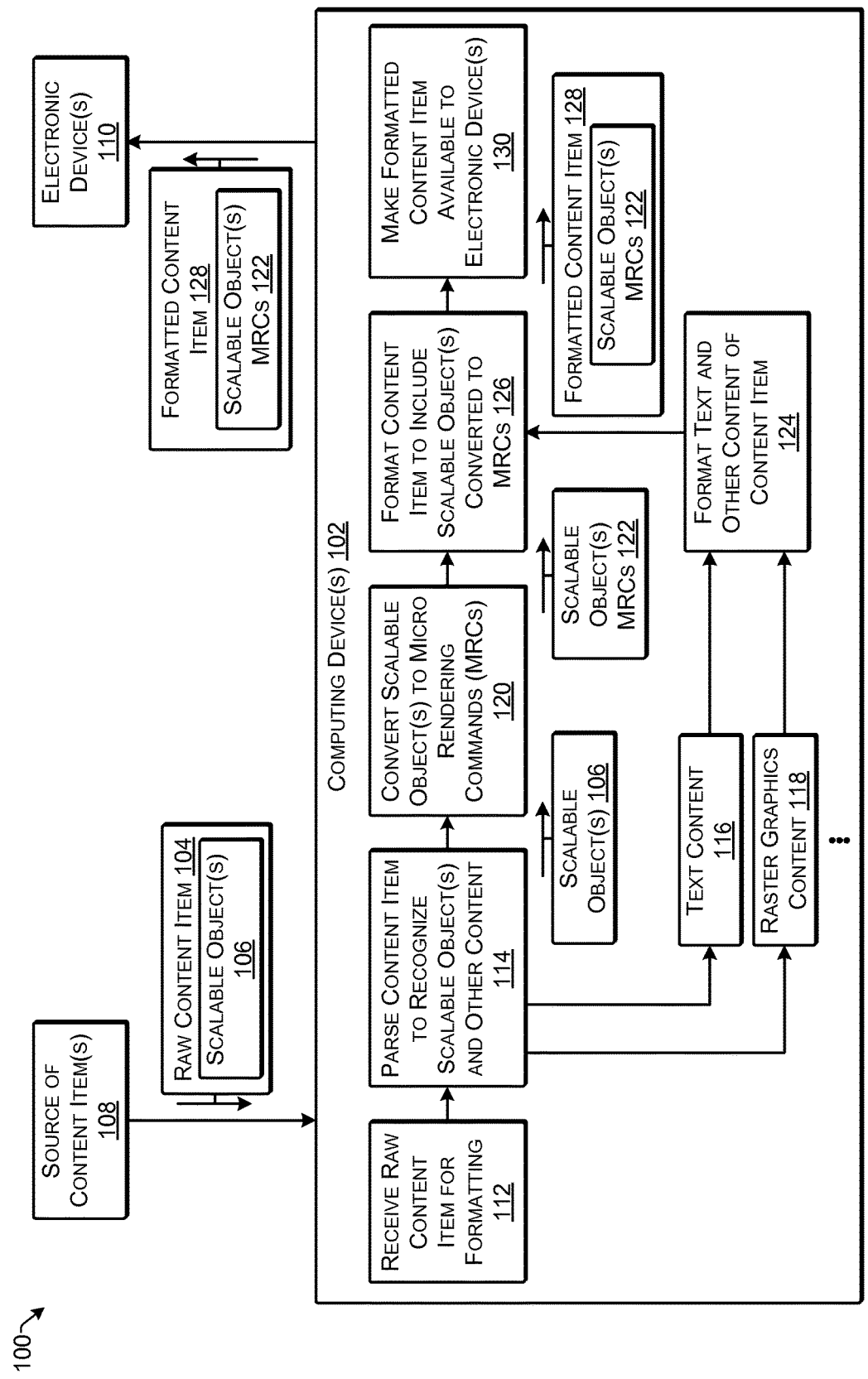
FIG. 1 illustrates an example framework for formatting a content item having a scalable object to represent the scalable object as micro rendering commands according to some implementations.

This disclosure includes techniques and arrangements for formatting and optimizing a content item for rendering on a client electronic device. In some examples, the formatting of the content item includes identifying one or more vector graphic scalable objects (hereafter "scalable objects") included in the content item being formatted. The identified scalable objects can be extracted from the other content of the content item and reformatted as portable micro level scalable rendering commands (hereafter "micro rendering commands"). These micro rendering commands can be executed with minimal computation requirements on a client electronic device for rendering an image as a scalable object on the electronic device during presentation of the content item on the electronic device. For instance, the micro rendering commands may be optimized for efficient parsing and rendering, such as using a real graphics rendering call. In addition, some examples herein provide a framework for electronic book (eBook) ingestion that includes conversion of scalable objects contained in an eBook to a set of micro rendering commands that replace the scalable objects originally provided in a more complex vector graphics format.

As one example Mathematical Markup Language (MathML) is an application of XML (Extensible Markup Language) for describing mathematical notations, such as mathematical equations, formulae and other expressions. According to some implementations herein, a MathML object, such as an equation included in a textbook in eBook format, can be converted to a set of micro rendering commands. Thus, the original XML code for the MathML object in the eBook can be recognized during formatting of the eBook and replaced with micro rendering commands expressed as a plurality of paths, such as lines and Bezier curves, or the like. Consequently, the rendering engine on the client electronic device is not required to be compatible with various vector graphic formats and can use a binary or other simple protocol to render the equation expressed using the micro rendering commands. Accordingly, when the eBook is presented on the client electronic device, the mathematical equation can be rendered more quickly and efficiently using a binary parser or other fast content parser, which can be substantially faster and less computationally demanding than using XML parsing.

As another example, Scalable Vector Graphics (SVG) is a vector graphics standard established by the World Wide Web Consortium (W3C), an international standards organization for the World Wide Web. SVG is an XML-based vector image format for two-dimensional graphics that has support for interactivity and animation. Rendering SVG typically involves conversion to raster format at a resolution appropriate for the current display. There is also a version of SVG for mobile devices called "SVGT" (SVG Tiny version). However, the SVG standard is complex and has been slow in becoming fully established. Because SVG images are expressed as XML files, SVG images can be created and edited with a text editor, but are typically created using vector graphics editing programs such as InkScape®, available from Software Freedom Conservancy Corp., of New York, or Adobe Illustrator®, available from Adobe Systems Inc., of California.

According to some implementations, a content item processing framework is able to recognize an SVG image or other scalable object in a content item, such as an eBook, that is being prepared and formatted for distribution to client electronic devices. The framework may extract and convert the SVG image to a plurality of micro rendering commands. Executable code including the micro rendering commands may be inserted into, or otherwise associated with, the content of the eBook in place of the XML code or other original code corresponding to the SVG image. The formatted eBook having the associated micro rendering commands may then be downloaded or otherwise provided to one or more client electronic devices. When the formatted eBook is subsequently accessed on the electronic device, the scalable image is rendered on the electronic device by parsing and rendering the micro rendering commands. This can substantially increase of the performance of the electronic device as compared to parsing and rendering the original SVG image in the XML format. Further, the micro rendering commands are fully scalable for different resolutions as with other types of vector graphics.

The implementations herein may enhance performance of an electronic device by allowing use of a single parser on the electronic device. For example, the use of the micro rendering commands herein with a content item removes the computation of transformations, shapes and color names. The conversion of scalable graphics objects to micro rendering commands in advance by a server, during formatting of a content item, can make the content item more compact to download to a client electronic device and can enable the content item to function across multiple platforms. Furthermore, advance conversion of scalable vector graphic objects to the micro rendering commands enables a client electronic device to render more efficiently the scalable objects that were originally in various different formats, such as MathML, SVG, Vector Markup Language, MetaPost, DrawingML, Microsoft PowerPoint, Virtual Reality Modeling Language, Portable Document Format, TrueType, and other vector graphic/scalable object formats. Thus, these scalable objects can be rendered more efficiently using rendering commands that can be quickly parsed and rendered on a client electronic device, such as a thin client device having a lower level of processing capacity than the server, and without using complex and computationally expensive techniques such as trigonometric calculations, matrix multiplication, and the like.

The micro rendering commands herein may be used to render equations, diagrams, charts, symbols, shapes, and other images and scalable objects created using vector graphics. Thus, in some examples, a scalable object may be any image able to be expressed using the micro rendering commands herein for enabling rendering of the scalable object on a display, or the like. To ensure a similar rendering experience across various platforms, the architecture herein performs the major computations during preprocessing and formatting of a content item on a computing device of a content provider, which makes the rendering of the content item on the client electronic device less computationally intensive and faster. For example, for SVG images, the ingestion server of the content provider converts the SVG image to a set of micro rendering commands in a predefined order and then to a binary format or other suitable format for parsing and rendering on an electronic device. Similarly, MathML objects may be interpreted and rendered, such as by using STIX Fonts®, available from The Institute of Electrical and Electronics Engineers, Inc., New Jersey, and MathJax, available from the American Mathematical Society, Rhode Island, then converted to SVG, and then subsequently converted to micro level commands and the final renderable objects. The micro commands making up each scalable object are packaged as structural components of the formatted content item. Thus, implementations here are able to support vector graphic rendering for content items such as textbooks, children's books, reflowable documents, and other books or documents that include vector graphic image scalable objects.

For discussion purposes, some example implementations are described in the environment of simplifying expressions of vector graphics scalable objects, such as may be included in an electronic book. However, the implementations are not limited to the particular examples provided, and may be extended to other types of content items and other types of scalable objects, as will be apparent to those of skill in the art having the benefit of the disclosure herein.

FIG. 1 illustrates an example framework 100 according to some implementations. Portions of the framework 100 may be executed by one or more computing devices 102, such as one or more computing devices 102 of a content provider or any other entity that receives or obtains a raw content item 104 for formatting. The raw content item 104 may be an electronic book that includes one or more scalable objects 106, such as a vector graphics image or object, which may include MathML objects, SVG objects, or other scalable vector graphic images expressed using any of the vector graphic formats mentioned above or other vector graphic formats. The computing device 102 may receive the raw content item 104 from a source 108 of one or more content items. The source 108 may be any of a publisher, an author, a content item library of a content provider, or any other source of the raw content item 104 in an electronic format that includes a scalable object 106. Accordingly, implementations herein are not limited to any particular source, use or purpose for the raw content item 104 that is processed according to the implementations herein.

The raw content item 104 received by the computing device 102 is typically in a file format that is not compatible with one or more client electronic devices 110 that will ultimately be used to consume the content item. Some examples of the electronic devices 110 may include media player devices and eBook readers; tablet computing devices; desktop and terminal computing devices; smart phones and mobile communication devices; laptop and netbook computing devices; televisions; gaming systems; augmented reality and wearable computing devices; home electronic devices; automotive electronic devices; and any other device capable of accessing and rendering or displaying content items or the like. In some examples, the electronic device 110 is mobile or portable device having a processor that has a processing capability less than that of the computing device 102.

As indicated at block 112 the computing device 102 may receive the raw content item 104 for formatting from the source of content items 108. The raw content item 104 may optionally undergo initial identification, classification, and the like, such as identifying the source 108, determining a current format of the raw content item 104, assigning an identifier to the raw content item 104, and so forth. In some examples, the raw content item 104 may include associated metadata provided by the source 108 that provides additional information about the raw content item 104 such as a genre, author name, publisher name, copyright information and so forth.

As indicated at block 114, the computing device 102 parses the content of the raw content item 104. In the case of textual content items, such as eBooks, the computing device 102 processes and parses the raw content item 104 to make the content compatible with various display formats, device platforms, and so forth. For example, the computing device 102 may perform parsing and formatting of the raw content item 104, such as for making the content item compatible with one or more content presentation applications on a plurality of electronic devices on which the content item will be presented. Thus, the raw content item 104 may be converted from a first electronic format to a second electronic format. Several examples of current electronic book formats include the EPUB format, Mobipocket format, Kindle format (e.g., KF8), Portable Document Format (PDF), HTML (hypertext markup language) format, and so forth.

During parsing of the raw content item 104, the computing device 102 may identify the start location and end location of pages, paragraphs, sentences, images, scalable objects, etc., and may produce metadata for the content item 104 that identifies the properties of the content item to enable rendering of the content on an electronic device 110. Further, since the raw content item 104 may be originally created in any of a variety of different formats, the text of the raw content item 104 may be normalized by extracting the raw text from the raw content item 104 as text content 116, extracting image content as raster graphic content 118, and by extracting scalable object(s) 106 present in the content. Accordingly, during parsing of the raw content item 104 by the computing device 102, the computing device 102 may recognize one or more scalable image objects 106 that are present in the raw content item 104. As one example, a classifier may be trained to recognize certain indicators of a scalable object 106 such as recognizing certain XML commands, words or phrases, which may include the terms "svg," "mathml," or various other text typically used in code for representing a scalable object 106 according to various different vector graphic formats.

As indicated at block 120, the computing device 102 may convert a recognized scalable object 106 into a plurality of micro rendering commands. As discussed below with respect to FIG. 2, various techniques may be used to convert the scalable object 106 depending on the particular type and format of the scalable object 106. In some examples, the micro rendering commands may be further formatted as binary code that will be able to be parsed efficiently by a binary parser or other content parser on an electronic device. Accordingly, the scalable object 106 is reformatted from its original format to scalable object micro rendering commands 122.

As indicated at block 124, the computing device 102 may format the other content of the raw content item 104. For example, the text content 116, the raster graphics content 118 and/or other types of content, if compatible, may be formatted into a desired electronic book format, such as any of the formats discussed above.

As indicated at block 126, the computing device 102 may assemble and format the content from the raw content item 104 to include the text content 116, the raster graphics content 118, and the scalable object micro rendering commands 122 into a desired electronic book format to obtain a formatted content item 128 that includes the scalable object micro rendering commands 122. For example, executable code including the scalable object micro rendering commands 122 may be inserted directly into the content of the formatted content item 128 at the location at which the scalable object is to be displayed. For instance, the scalable object micro rendering commands 122 and associated code may be inserted directly into a designated location in the text content 116. During presentation of the formatted content item 128 on an electronic device 110, when a presentation application on the electronic device 110 encounters the scalable object micro rendering commands 122, the presentation application will render the scalable object 106 on a display of the electronic device 110 in a manner similar to the other content of the formatted content item 128. Accordingly, in some examples, the scalable object micro rendering commands 122 are inserted into the content of the content item in place of the original rendering information included with the raw content item 104 for the scalable object 106.

As another example, the scalable object micro rendering commands 122 may be included in a metadata file (not shown in FIG. 1) that will accompany the content of the formatted content item 128, and a link or other reference to the scalable object micro rendering commands 122 in the metadata file may be placed at the corresponding location in the content of the content item, such as at a designated location in the text of the content item. Thus, during presentation of the content on an electronic device 110, when the user reaches a page on which a scalable object is to be presented, the electronic device 110 may use the reference to access the metadata file to obtain the scalable object micro rendering commands 122 for rendering the scalable object 106 at the correct location in the formatted content item 128. Other variations will also be apparent to those of skill in the art having the benefit of the disclosure herein.

At block 130, the computing device 102 makes the formatted content item 128, including the scalable object micro rendering commands 122, available to the electronic devices 110. For example, when the computing device 102 completes formatting of the formatted content item 128, which may include formatting the text 116 of the content item, formatting other images 118 of the content item, and various other formatting and processing steps, the computing device 102 may add the formatted content item 128 to an online catalog, such as on a website, or may otherwise make the formatted content item 128 available for access by one or more electronic devices 110. As one example, the user of an electronic device 110 can purchase access to the formatted content item 128, and may stream or download the formatted content item 128 for presentation on the electronic device 110.

Figure 2:
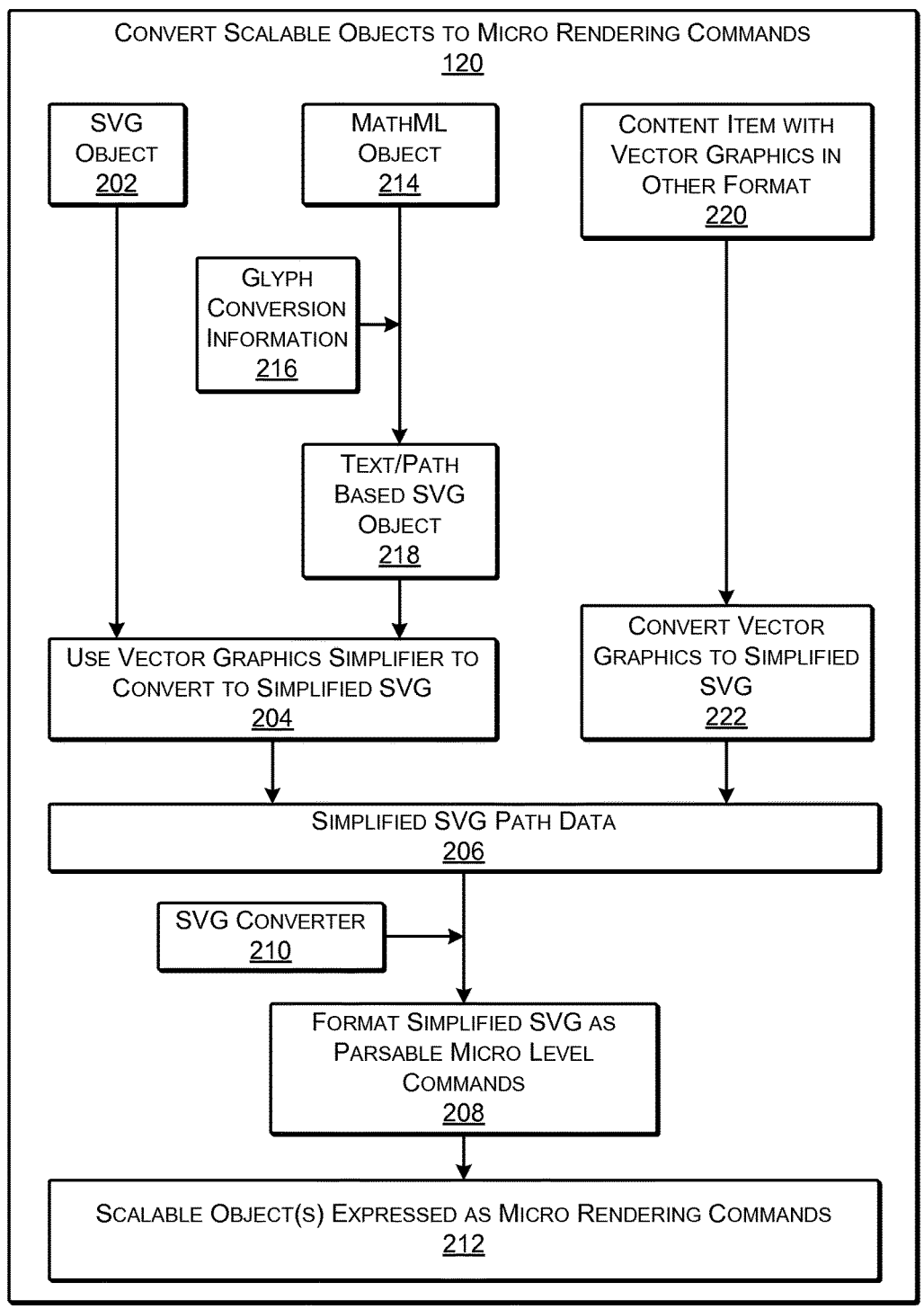
FIG. 2 illustrates an example framework for formatting various different types of scalable objects as objects expressed using micro rendering commands according to some implementations.

FIG. 2 illustrates an example framework 200 for formatting various different types of scalable objects into scalable objects expressed using micro rendering commands according to some implementations. The framework 200 may correspond to block 120 of FIG. 1 in some examples.

In some cases, the source of content items may provide a content item that includes an SVG object 202 as a scalable object. According to some examples, a complex SVG image (or other scalable object) can be reduced to a plurality of micro rendering commands using a series of steps. The micro rendering commands may include a relatively small command set (e.g., 5-12 different types of command), such as such as "Move-To," "Draw-a-Line-To," "Draw-a-Quadratic-Bezier Curve-To," "Draw-a-Cubic-Bezier-Curve-To," "Close-Path," and so forth. Thus, an entire SVG image object 202, including complex shapes such as polygons, circles, ellipses, cubes, arcs, gradients or clip paths, can be broken down to these simpler micro rendering commands. The overall SVG image object 202 is converted into a collection of these micro rendering commands, each corresponding to a portion of the overall image, and rendering a series of such shapes (e.g., paths, images, text, etc.) may constitute the complete overall SVG image.

In the example of FIG. 2, as indicated at block 204, an XML-based SVG object 202 may be converted to a set of intermediate simplified SVG path data 206, such as by using a vector graphics simplifier. As mentioned above, an example of a suitable vector graphic simplifier may include InkScape®, available from Software Freedom Conservancy Corp., New York. InkScape® or another suitable vector graphics editor, or other software with similar functionality, may be used at ingestion of a content item to breakdown a complex SVG object 202 into simple SVG paths (plus text and image if appropriate). For example, the vector graphics simplifier may convert complex SVG shape elements such as rectangles, circles, ellipses, polyline elements, and/or polygons into paths expressed as lines or Bezier curves. The vector graphics simplifier 204 may be configured as automated processing of a scalable object. Alternatively, as another example, a human editor may oversee or perform the simplification.

As indicated at 208, the simplified SVG data 206 may further be converted from SVG XML to a set of micro rendering commands for paths, fill colors, stroke colors, and so forth. As one example, an SVG converter 210 based on the SVG Tiny standard, such as Libsvgtiny, available from the Massachusetts Institute of Technology, Cambridge, Mass., may be used when converting the simplified SVG data into the micro rendering commands. Thus, the Libsvgtiny library or other suitable SVG converter 210 may be used to parse a valid SVG XML object expressed as simplified SVG path data 206, and convert the simplified SVG path data 206 to a set of rendering operations. These micro rendering commands are then stored or otherwise associated with the content item as a scalable object expressed as a set micro rendering commands 212 to replace the XML SVG object 202 in the content item. Further, in some situations, the application of the SVG converter 210 may be skipped, such as in the case that the SVG simplifier 204 has already sufficiently simplified the complex SVG commands into one or more renderable path commands.

As mentioned above, as few as five micro level rendering commands may be employed in some implementations herein to express complex vector graphic scalable objects. Thus, in some examples, the micro level rendering commands may include a move-to command (e.g., "kMoveTo") which may establish a starting point on a screen to start drawing a scalable object; a draw-line-to command (e.g., "kLineTo") which may cause a line to be drawn from a current position to a specified position; a draw-quadratic-Bezier-curve command (e.g., "kQuadTo") which may cause a quadratic Bezier curve to be drawn from a current position to a specified position; a draw-cubic-Bezier-curve command (e.g., "kCubeTo") which may cause a cubic Bezier curve to be drawn from a current position to a specified position; and a close-path command (e.g., "kClosePath") which may cause the path to be closed by drawing a line from the current point to the starting point of the path.

Example pseudocode set forth below provides an example of converting these five commands to renderable graphics instructions:

```
for(int index = 0; index < fPathLen;)
{
  switch((PathCmd)(int)(fPath[index]))
  {
    case kMoveTo:
      surface->moveTo(yj::Point(fRatio*fPath
              [index+1], fRatio*fPath[index+2]));
      index += 3;
      break;
    case kLineTo:
      surface->lineTo(yj::Point(fRatio*fPath
              [index+1], fRatio*fPath[index + 2]));
      index += 3;
      break;
    case kQuadTo:
      surface->addQuadCurve(fRatio*fPath[index+1],
              fRatio*fPath[index+2],
              fRatio * fPath[index + 3],
              fRatio * fPath[index +4]);
      index += 5;
      break;
    case kCubeTo:
      surface->addCurve(fRatio * fPath[index + 1],
              fRatio*fPath[index + 2], fRatio *
              fPath[index + 3],fRatio * fPath
              [index + 4], fRatio * fPath[index +
              5],fRatio * fPath[index + 6]);
      index += 7;
      break;
    case kClosePath:
      surface->closePath( );
      index += 1;
      break;
  }/* end switch case */
}/* end for */
```

The foregoing example pseudocode sets forth five example commands that can be used as the micro rendering commands herein, namely, a move-to command, and four different types of path commands, i.e., the line-to command, the quadratic-curve command, the cubic-curve command and the close-path command. Further, while five commands have been described herein, other types of micro rendering commands that may be used will be apparent to those of skill in the art having the benefit of the disclosure herein. On execution of the above pseudocode by a processor, control may move through a path array and create path objects. Subsequently, based on stroke information (e.g., stroke width and stroke color) and fill information (e.g., fill color) for the original scalable object, stroke and/or fill information may be specified for the micro level rendering commands.

Accordingly, the vector graphics simplifier and/or the SVG converter may be used for breaking down complex SVG shapes, such as a circle element, a polygon element, a polyline element, a rectangle element, an ellipse element, a 3-D cube element, an arc element, a gradient element, etc., into a series of simpler path commands as described above. This set of simple commands may be translated/formatted as shown above into a format that can be parsed by a content parser on an electronic device. For example, values associated with the micro rendering commands may be transformed into real coordinate values and applied to the respective scalable objects. This substantially eliminates the need for calculating any transformations while rendering a scalable object. Furthermore, the formatting may normalize the coordinates, the colors used, and other units to simpler units. As one example, color names may be translated to RGB values.

The micro rendering commands, such as path commands, fill color information, stroke color, stroke width, and the like, are formatted to be parsable by a content parser on an electronic device that may also be used to parse the other content of the content item. Accordingly, in addition to removing the dependency on XML, this process enables what is typically a speedier alternative to XML parsing. Thus, converting the SVG image object 202 to an object expressed as micro rendering commands 212 may enable rendering of vector graphics objects without caching any of the graphics as layers or path objects, while enabling rendering of a vector graphics object on demand, such as when a user turns to a page of a content item that includes a scalable object for display.

As another example illustrated in FIG. 2, a MathML object 214 may be converted to a text/path based SVG object 218 using an open source JavaScript® library, such as MathJax, along with STIX Fonts® and/or PhantomJS. In some cases, the MathML object 214 can be converted to a text based shape object or directly to a shape object expressed by plurality of paths. For instance, STIX Fonts® is a comprehensive font set of mathematical symbols and alphabets that can be used by MathJax to generate and display mathematical notation of an equation, which can be expressed as a text and path based SVG object 218. MathJax and Stix Fonts® are open source under non-GPL license. In some examples, the text/path based SVG object 218 may then be further simplified by a vector graphics simplifier, as indicated at 204, to produce simplified SVG path data 206, which can then be formatted as a scalable object expressed as micro-rendering commands 212 using the SVG converter 210, such as the Libsvgtiny library.

As another example illustrated in FIG. 2, the source of content items may provide a content item 220 having vector graphics scalable objects in a format other than SVG or MathML. As indicated at block 222, these vector graphics in the other format may be converted to vector graphics in simplified SVG to obtain simplified SVG path data 206. For example, a vector graphic editor, such as InkScape® may be used to convert the vector graphics scalable object to simplified SVG format. Subsequently, a scalable object expressed as micro rendering commands 212 may be obtained as discussed above. Furthermore, while several examples have been provided for converting scalable objects to micro rendering commands, numerous other variations will be apparent to those of skill in the art in light of the disclosure herein.

Figure 3:
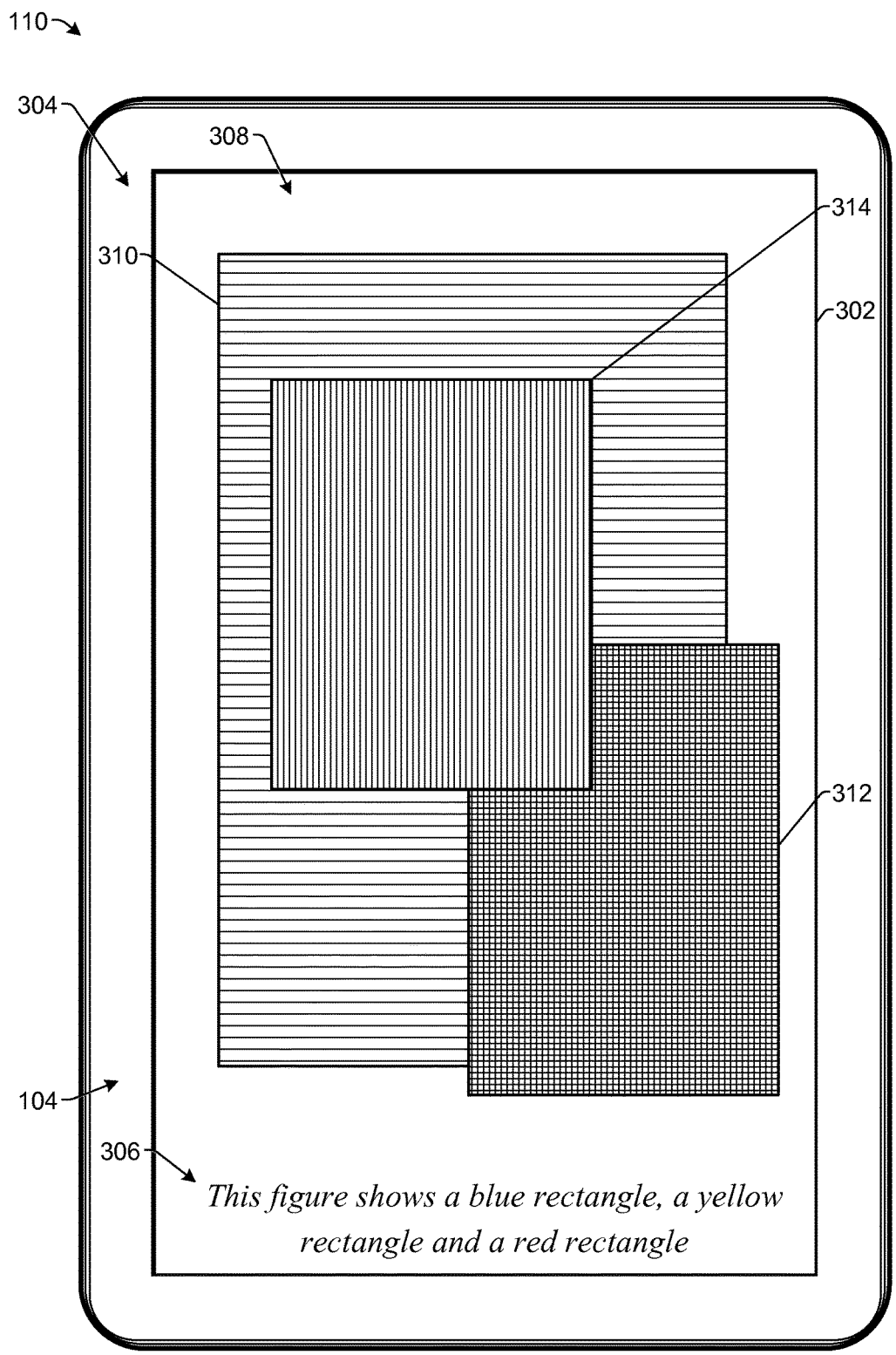
FIG. 3 illustrates an example electronic device able to display a content item that includes one or more scalable objects expressed using micro rendering commands according to some implementations.

FIG. 3 illustrates an example electronic device 110 able to present a formatted content item 128 including a vector graphics scalable object that is rendered during the presentation of the formatted content item 128 according to some implementations. The electronic device 110 may be implemented as any of a number of different types of electronic devices, as discussed above. The electronic device 110 may include, or may have associated therewith, a display 302 to present an interface 304 for displaying text 306 and/or an image or other scalable objects 308 included with the content of a formatted content item 128.

In some cases, the formatted content item 128 may be an electronic book (eBook) including the text 306 and one or more scalable image objects 308, such as on one or more pages of the eBook. For example, the display 302 may present the text 306 of an eBook and any scalable objects 308 and/or other images, such as photos, illustrations, tables, maps, or other graphic elements that might be contained in the eBook. The terms "book" and/or "eBook," as used herein, may broadly include electronic or digital representations of printed works with vector graphics, as well as digital content that may include vector graphics, text, multimedia, hypertext, and/or hypermedia. Examples of formatted content items 128 may include, but are not limited to, electronic versions of books, magazines, newspapers, periodicals, journals, reference materials, textbooks, anthologies, instruction manuals, proceedings of meetings, forms, directories, web pages, plays, screen plays, closed captioning transcripts of movies and television shows, song lyrics, personal documents, and so forth, as well as other types of content items including vector graphic images and/or text that a user may view or interact with using the electronic device 110.

In this example, the scalable objects 308 include three rectangles, namely a first rectangle 310, a second rectangle 312 and a third rectangle 314. The example XML SVG code also specifies a color for each rectangle and a location on the page for each rectangle. For instance, the first rectangle 310 may have a blue fill, the second rectangle 312 may have a yellow fill, and the third rectangle 314 may have a red fill. Set forth below is an example of XML SVG code that may be used to specify rendering of the vector graphic image objects 308.

```
<svg
    xmlns:dc="http://example1.org/dc/elements/1.1/"
    xmlns:cc="http://example2.org/ns#"
    xmlns:svg="http://www.example3.org/2000/svg"
    xmlns="http://www.example3.org/2000/svg"
    version="1.1"
    width="744.09448"
    height="1052.3622"
    id="svg2">
    <defs
        id="defs4"/>
    <g
        id="layer1">
        <rect
            width="551.42853"
            height="880"
            x="94.285713"
            y="95.219322"
            id="rect2985"
            style="fill:#0000fr" />
    </g>
    <rect
        style="fill:#ffff00"
        id="rect3773"
        width="334.43713"
        height="490.50778"
        x="365.65128"
        y="517.26276" />
    <rect
        style="fill:#ff0000"
        id="rect3775"
        width="347.81461"
        height="441.45703"
        x="151.6115"
        y="231.87642" />
</svg>
```

The above XML SVG code incorporates a "rect" instruction that corresponds to each rectangle 310, 312 and 314, and further specifies the fill color, width, height, and location of the rectangle on the page being rendered. Accordingly, the example XML SVG describes three complex shapes (i.e., rectangles), and would require parsing of the XML code during the rendering of the scalable objects 308.

On the other hand, after the scalable objects have been converted to micro rendering commands and formatted for rendering on an electronic device, such as using the techniques described above, an example of pseudocode for rendering the scalable objects 308 on the electronic device 110 may be expressed as follows:

```
storyline::{
    story_name: chap0_text,
    content_list: [
        {
            id: 39,
            type: svg,
            fixed_width: 800,
            fixed_height: 800,
            min_auto_shrink: 0.1,
            shape_list: [
                {
                    type: shape,
                    fill_color: 0xff0000ff,
                    path: [ 0, 94.2857, 95.2193, 1, 645.714,
95.2193, 1, 645.714, 975.219, 1, 94.2857, 975.219, 4 ]
                },
                {
                    type: shape,
                    fill_color: 0xffffff00,
                    path: [0, 365.651, 517.263, 1, 700.088,
517.263, 1, 700.088, 1007.77, 1, 365.651, 1007.77, 4]
                },
                {
                    type: shape,
```

```
        fill_color:0xffff0000,
        stroke: 0x000000,
        stroke_width:1,
            path: [0, 151.611, 231.876, 1, 499.426,
  231.876, 1, 499.426, 673.333, 1, 151.611, 673.333, 4 ]
            }]
        },
    ]
}
```

Thus, the above example code sets forth three respective path commands that each include a series of simple paths that replace the complex shapes, i.e., the rectangle elements in this example, which were previously specified using the "rect" command along with a width and a height. Examples of other complex shapes in the SVG standard that may be converted to simple paths include a circle element, an ellipse element, a polyline element, a polygon element, a 3D cube element, an arc element and a gradient element. The path commands in the above example code may be simplified further, such as, for example, a "0" may indicate a "MoveTo" command, a "1" may indicate a "LineTo" command and a "4" may indicate a "ClosePath" command in the above pseudocode. Further, the use of a "ClosePath" command may automatically indicate that the shape specified by the path sequence should be filled using a specified fill color. Accordingly, for example, the path command "path: [0, 94.2857, 95.2193, 1, 645.714, 95.2193, 1, 645.714, 975.219, 1, 94.2857, 975.219, 4]" sets for an instruction to move to (x, y) coordinates "94.2857, 95.2193," draw a line from there to coordinates "645.714, 95.2193," draw a line from there to "645.714, 975.219," draw a line from there to "94.2857, 975.219," and then the "4" at the end of the sequence indicates that another line should be drawn back to the starting point to close the path. Thus, the complex shape element in the XML code has been converted to a path command comprising a sequence of paths that correspond to the complex rectangle shape element. Other complex shapes may be similarly expressed using the simple micro rendering commands described herein. For example, an SVG circle element may be converted to four cubic Bezier curve paths, an SVG polygon element may be converted to a plurality of line paths, a gradient stroke may be expressed as a sequence of paths with a gradient fill, and so forth.

As mentioned above, the coordinates, colors, and other units may be normalized to simple units to improve the parsing and rendering time of the micro level commands on an electronic device. Furthermore, as mentioned above, the micro level commands are associated with the appropriate location in the content of the formatted content item 128 to ensure that the micro level commands are executed to display the corresponding scalable objects 308 at the correct location during presentation of the content item. For instance, in this example, the scalable objects 308 are displayed with the text 306, which may be a caption for the figure represented by the scalable objects 308.

Figure 4:
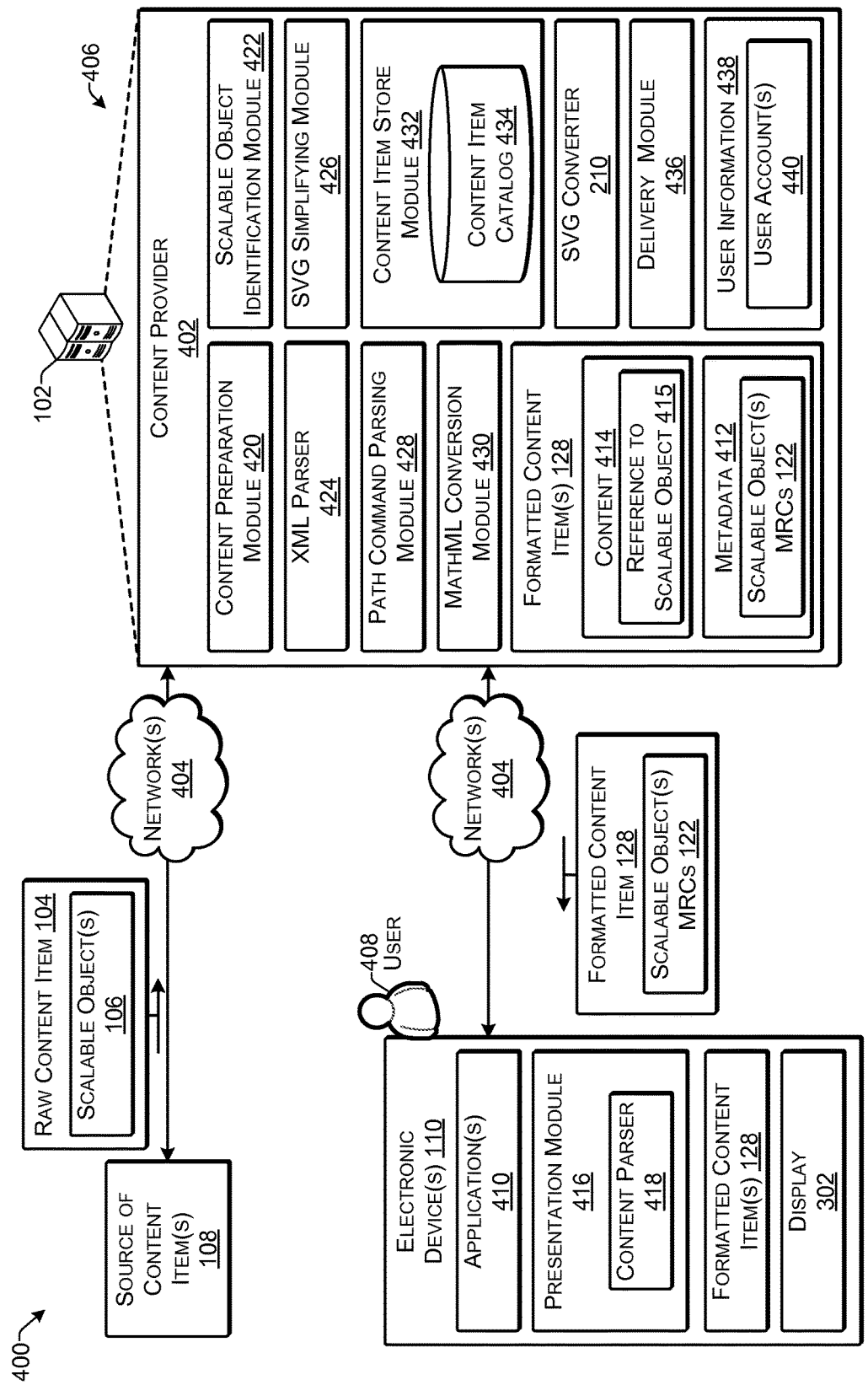
FIG. 4 illustrates an example architecture of a system for formatting and preparing a content item having a scalable object expressed using micro rendering commands and delivering the content item to a client electronic device according to some implementations.

FIG. 4 illustrates an example architecture of a system 400 for preparing a content item having a scalable object expressed as micro rendering commands and delivering the content item to a client electronic device according to some implementations. In some examples, formatted content items 128 may be presented by one or more electronic devices 110 capable of displaying, rendering or otherwise presenting the formatted content items 128.

In the illustrated example, one or more electronic devices 110 are able to communicate with a content provider 402. For instance, each electronic device 110 may communicate with one or more computing devices 102 of the content provider 402, to access or receive information related to the formatted content items 128 over one or more networks 404. For example, the network(s) 404 may include a local area network (LAN), a wide area network (WAN), such as the Internet, or any combination thereof, and may include both wired and wireless communication technologies using any suitable protocols and communication techniques. The computing device 102 of the content provider and the electronic device 110 may communicate and interact with one another using any combination of suitable communication and networking protocols, such as Internet protocol (IP), transmission control protocol (TCP), hypertext transfer protocol (HTTP), and so forth. Additionally, in some cases, the electronic device 110 may download one or more formatted content items 128 from the content provider 402, stream one or more formatted content items 128, or the like.

In some examples, the content provider 402 may maintain an online location or site 406, such as a merchant website, an e-commerce site, or other functionality that may offer one or more formatted content items 128 to the public. For example, the content provider site 406 may be hosted on one or more of the computing devices 102. In some cases, the computing devices 102 may be one or more web servers located at a data center, server farm, or other single physical location. In other cases, the content provider site 406 or portions thereof may be located in diverse locations that are physically remote from one another. Further, in some implementations, the content provider site 406 may be a group of websites, data stores, services, and the like, hosted on a plurality of different computing devices 102 in a plurality of diverse locations, or hosted by one or more computing devices 102 at a single location.

The content provider site 406 may offer formatted content items 128 to the public, such as a user 408, through an online presence accessible by a web browser or other application 410 on the electronic device 110. The content provider site 406 alternatively, or additionally, may offer formatted content items 128 through an online or mobile application executing on the electronic device 110. For example, an application 410 on the electronic device 110 may connect to or obtain information from the content provider site 406, such as the interface 304 described above, to enable the user 408 of the electronic device 110 to select, purchase or manage one or more formatted content items 128. In some cases, the content provider site 406 may enable the user 408 of the electronic device 110 to access or acquire formatted content items 128 through an online or mobile application 410 executing on a mobile electronic device 110. Accordingly, the content provider site 406 is not limited to a website accessed by a browser, but may encompass other technologies for marketing formatted content items 128, such as through in-application shopping, mobile applications, and the like.

The user 408 may access or receive one or more formatted content items 128 from the content provider site 406, such as by downloading or streaming through the network 404. For example, the content item received by an electronic device 110 may include scalable objects represented as micro-rendering commands 122 as discussed above. In some examples, each formatted content item 128 provided by the content provider 402 may include metadata 412 and content 414. In some examples, the metadata 412 may include the scalable object micro-rendering commands 122 corresponding to a scalable object identified from the raw content item 104, as discussed above with respect to FIG. 1. For instance, a link or reference 415 may be inserted into the content 414 of the content item 128 at the location at which the scalable object is to be rendered. The reference 415 may point to the scalable object micro rendering commands 122 maintained at a location in the metadata 412. In some examples, the metadata 412 may be contained in a separate file from the content 414, while in other examples the metadata 412 may be combined with the content 414 into a single file. Furthermore, in other examples, the scalable object microrendering commands 122 are included directly in the content 414 of the formatted content item 128, such as co-located with other content to be rendered on the same page as the scalable object.

In some cases, multiple versions of the same content item 128 may be maintained by the content provider 402. For example, a first version of the content item 128 formatted in a first electronic book format may be maintained for a first type of electronic device 110, and a second version of the content item 128 in a second, different electronic book format may be maintained for a second, different type of electronic device 110. As another example, a first type of electronic device 110 may use a version of the content item 128 in which the scalable object micro rendering commands 122 are included directly in the content 414 of the content item 128, while a second type of electronic device may use a version of the content item 128 in which the scalable object micro rendering commands 122 are contained in a separate location in metadata 412.

The electronic device 110 may include a presentation module 416, which may include functionality for presenting the one or more formatted content items 128 on the display 302 of the electronic device 110. In some examples, the presentation module 416 includes a content parser 418 that parses the content 414 of the formatted content item 128, including the micro rendering commands 122 that represent the scalable object. Thus, a user input may be received by the electronic device 110 to cause presentation of a portion of content 414 of the formatted content item 128. As one example, when a particular location in the content 414 is reached, the electronic device 110 may present the scalable object represented as micro rendering commands 122 on the display 302. For example, the scalable object may be rendered on demand, such as upon the user turning a page, by parsing and rendering the scalable object micro rendering commands 122.

In some implementations, the content provider 402 may include a content preparation module 420 that may receive the raw content item 104 from the one or more sources 108 of content items, such as publishers, authors, artists, storage, and so forth, such as over the one or more networks 404. In the case of eBooks and other textual content items, the content preparation module 420 may receive a raw content item 104 from the publisher, author, or other source 108 of content items, and may parse and process the raw content item 104 to make the content item compatible with various display formats, device platforms, and so forth. For example, the content preparation module 420 may identify the start location and end location of pages, paragraphs, sentences, the location of images, and other information about the content item. Further, the content preparation module 420 may produce metadata 412 for the content item that identifies the content item and the properties of the content item to enable rendering of the content item on an electronic device 110.

Further, since raw content item 104 may be initially created in any of a variety of different formats, the text of the raw content item 104 may be normalized by extracting the raw text from the raw content item 104, as discussed above. The normalization may include tokenization of the extracted text, which may include parsing the text of the content item into tokens that may include individual words, punctuation marks, symbols, etc., contained in the text of the content item, and associating location information with each token identified in the raw content item 104. Tokens may further be assigned to images, including vector graphic scalable objects, for identifying a location within the content item of each image or object. Thus, each word, punctuation mark, and image may be assigned a unique location sequence or value, such as based on an offset of the token from the beginning of the content item and a number of characters in the token, which may be referred to as the length of the token. Accordingly, the content preparation module 420 is able to determine the location in the content of the content item at which to insert executable code corresponding to the scalable object micro rendering commands 122 (or a reference thereto) based on one or more tokens corresponding to the location of the original scalable object in the raw content.

The content preparation module 420 may parse, process and normalize the text of the raw content item to produce the content 414 that is compatible with various electronic book display formats, device platforms, and so forth. The content preparation module 420 may further parse and analyze a raw content item to produce at least a portion of the metadata 412 that corresponds to the formatted content item 128. Further, as discussed above, the content preparation module 420 may recognize one or more scalable objects 106 included in the raw content item 104, and may convert the one or more scalable objects 106 to one or more respective scalable object micro rendering commands 122. For example, the content preparation module 420 may include or may access a scalable object identification module 422 that may include a classifier or the like for identifying scalable objects contained in the content item. For example, the scalable object identification module 422 may be trained to recognize various words, phrases, or text formats indicative of scalable objects, such as the words "svg," "mathml," or the like.

Furthermore, the content preparation module 420 may include or may access an XML parser 424 that may be used to parse any XML code included with the raw content item 104. In addition, the content preparation module 420 may include or may access an SVG simplifying module 426. For example, the SVG simplifying module 426 may be executed to apply a vector graphics simplifier, such as InkScape®, or other suitable software for converting complex SVG shapes into a plurality of paths to create the simplified SVG data 206 discussed above. In addition, in some examples, the SVG simplifying module 426 may further include the capability of converting other vector graphics format types, such as those mentioned above, to simple SVG commands. Additionally, the content preparation module 420 may include or may access a path command parsing module 428 that may apply the SVG converter 210, such as Libsvgtiny, or other suitable software for converting the simplified SVG path commands from XML into a parsable format suitable for parsing by the content parser 418 on the electronic device 110. Furthermore, the content preparation module 420 may include or may access a MathML conversion module 430 that may apply MathJax, STIX Fonts® and/or PhantomJS for converting a MathML object to a text and/or path based shape object, or directly to a shape object expressed by plurality of paths, as discussed above.

In addition, the content provider site 406 may include a content item store module 432 that may provide or may access a content item catalog 434. For example, the content item store module 432 may present the content item catalog 434 to an electronic device 110 that accesses the content provider site 406 such as during shopping for a formatted content item 128. The content item catalog 434 may include searchable and/or browsable listings and descriptions of formatted content items 128 available from the content provider site 406. The content item store module 432 may communicate with the electronic device 110 to enable the user 408 to locate and acquire a desired formatted content item 128 from the content provider site 406.

The content provider site 406 may further include a delivery module 436 that may deliver (or make available for delivery) a formatted content item 128 to the electronic device 110 and/or the user 408. For example, in some instances, the delivery module 436 may facilitate the download of a formatted content item 128 to the electronic device 110 over the network(s) 404 following a purchase of access to the formatted content item 128. In other instances, the delivery module 436 may provide for delivery of a hard copy of a formatted content item 128 to the user 408, such as by delivery of a storage medium that maintains a copy of the content item, or a printed version of the formatted content item 128, depending on the nature of the content item and the electronic device 110. The delivery module 436 may also expose programmatic interfaces or APIs (application programming interfaces) that the electronic device 110 can use to obtain formatted content items 128 and related services. Additionally, in some examples, the formatted content item 128 may be converted to binary code prior to sending to the electronic device 110, and the content parser 418 may be a binary parser able to quickly and efficiently parse the content item 218, including the scalable object micro rendering commands 122.

Furthermore, in some implementations, the content provider 402 may maintain user information 438. For example, the user information 438 may include one or more user accounts 440, which may include user data, such as user contact information, a purchase history, a user content item library, information on various devices 110 associated with a particular user account 440, or other records relating to content items purchased by the user 408, as well as records of other transactions of the user 408 with the content provider 402.

Figure 5:
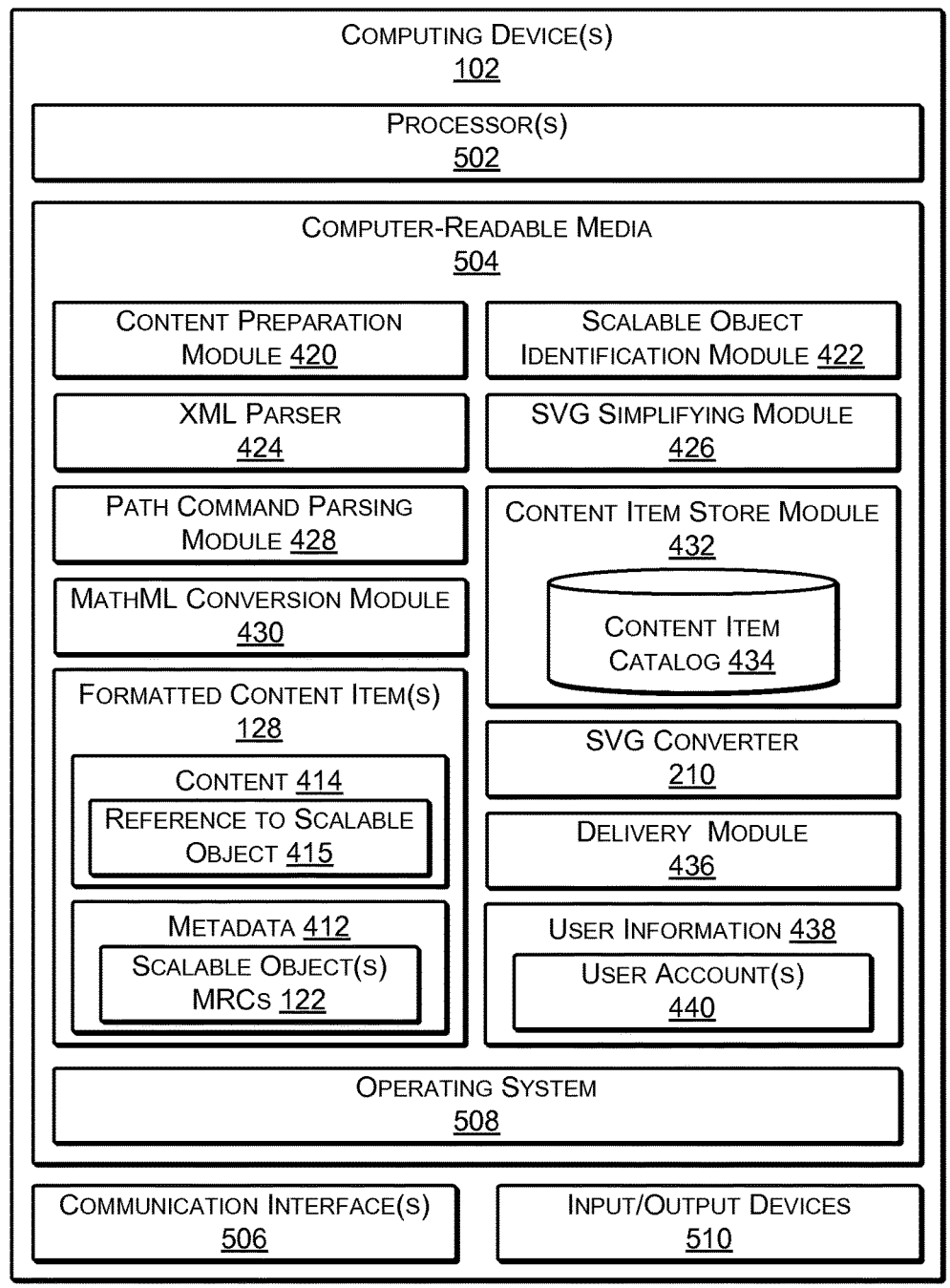
FIG. 5 illustrates select components of one or more example computing devices according to some implementations.

FIG. 5 illustrates select components of one or more computing devices 102 that may be used to implement the functionality described herein according to some implementations. The computing device(s) 102 may include one or more servers or other types of computing devices that may be embodied in any number of ways. For instance, in the case of a server, the computing device(s) 102 may be a single server, a cluster of servers, a server farm or data center, a cloud hosted computing service, and so forth, although other computer architectures (e.g., a mainframe architecture) may also be used. Further, while the figures illustrate the components of the computing device 102 as being present in a single location, these components may be distributed across different computing devices and locations in any manner. Generally, the computing device 102 may be implemented by one or more computing devices, with the various functionality described above distributed in various ways across the different computing devices. The computing devices may be located together or separately, and organized, for example, as virtual servers, server banks and/or server farms. The described functionality may be provided by the computing devices of a single entity or enterprise, or may be provided by the computing devices and/or services of multiple entities or enterprises.

As illustrated in FIG. 5, an example computing device 102 includes one or more processors 502, one or more computer-readable media 504, and one or more communication interfaces 506. The processor(s) 502 may be a single processing unit or a number of processing units, may include single or multiple computing units or multiple processor cores, and may include microprocessors, microcomputers, microcontrollers, digital signal processors, central processing units, logic circuits, state machines, a system-on-chip, and the like. As one example, the processor(s) 502 may be one or more hardware processors and/or logic circuits of any suitable type specifically programmed or configured to execute the algorithms and processes described herein. The processor(s) 502 can be configured to fetch and execute computer-readable instructions stored in the computer-readable media 504 or other computer-readable media.

The computer-readable media 504 may include volatile and nonvolatile memory and/or removable and non-removable media implemented in any type of technology for storage of information, such as computer-readable instructions, data structures, program modules or other data. Such computer-readable media includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the computing device 102, the computer-readable media 504 may be a type of tangible computer storage media and may be a non-transitory storage media.

The computer-readable media 504 may be used to store any number of functional components that are executable by the processors 502. In many implementations, these functional components comprise instructions or programs that are executable by the processors 502 and that, when executed, implement operational logic for performing the actions attributed above to the computing device 102. Functional components of the computing device 102 that may be executed on the processors 502 for implementing the various functions and features related to providing scalable objects with content items, as described herein, include the content preparation module 420, the scalable object identification module 422, the XML parser 424, the SVG simplifying module 426, the path command parsing module 428, the MathML conversion module 430, the content item store module 432, and the delivery module 436. Additional functional components stored in the computer-readable media 504 may include an operating system 508 for controlling and managing various functions of the computing device 102.

In addition, the computer-readable media 504 may include, or the computing device 102 may access, data, which may include the one or more formatted content items 128. The data may further include the content item catalog 434 and the user information 438. In addition, the computing device(s) 102 may include many other logical, programmatic and physical components, of which those described above are merely examples that are related to the discussion herein.

The communication interface(s) 506 may include one or more interfaces and hardware components for enabling communication with various other devices, such as the electronic devices 110 over the network(s) 404. For example, communication interface(s) 506 may facilitate communication through one or more of the Internet, cable networks, cellular networks, wireless networks (e.g., Wi-Fi, cellular) and wired networks. Various different approaches to implementations described herein can be implemented in various environments. For instance, the network(s) 404 may include any appropriate network, including an intranet, the Internet, a cellular network, a LAN, WAN, VPN or any other network or combination thereof. Components used for such a system can depend at least in part upon the type of network and/or environment selected. Protocols and components for communicating via such networks are well known and will not be discussed herein in detail.

Computing device 102 may further be equipped with various input/output devices 510. Such I/O devices 510 may include a display, various user interface controls (e.g., buttons, mouse, keyboard, touch screen, etc.), audio speakers, connection ports and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Figure 6:
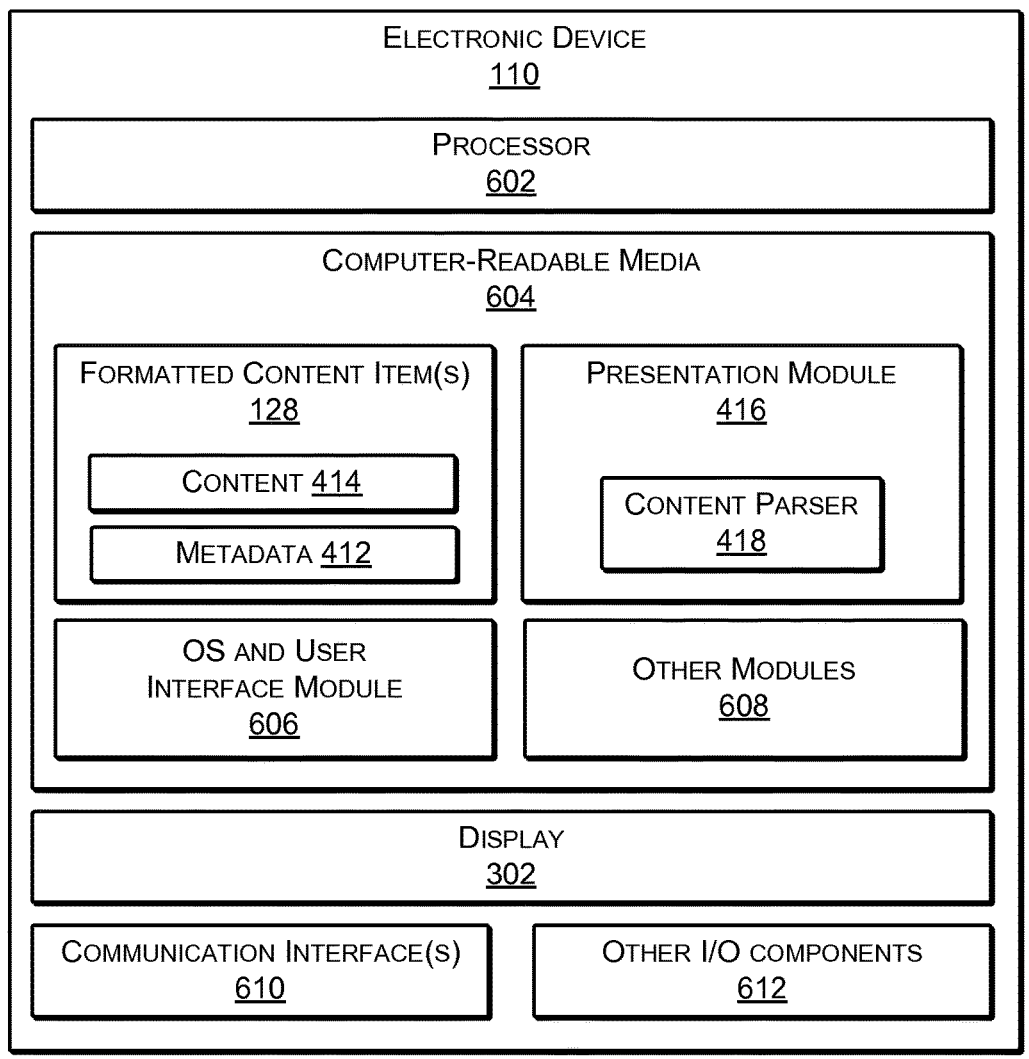
FIG. 6 illustrates select components of an example electronic device according to some implementations.

FIG. 6 illustrates select example components of the electronic device 110 that may be used to implement the functionality described above according to some implementations. In a very basic configuration, the electronic device 110 includes, or accesses, components such as at least one control logic circuit, central processing unit, or processor 602 and one or more computer-readable media 604. Each processor 602 may itself comprise one or more processors or processing cores, and may any suitable type of processor, as described above with respect to the processor 502. In some examples, the processor 602 has a lower processing capability than the processor 502 included in the content provider computing device 102 discussed above. Accordingly, by converting scalable objects to the micro level rendering commands herein in advance on the content provider computing device 102, the processing demands on the processor 602 used during rendering of a scalable object included in a content item 128 can be reduced as compared with rendering the scalable object on the electronic device 110 in SVG or other vector graphics format.

Depending on the configuration of the electronic device 110, the computer-readable media 604 may be an example of tangible non-transitory computer storage media and may include volatile and nonvolatile memory and/or removable and non-removable media implemented in any type of technology for storage of information such as computer-readable instructions, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor 602 directly or through another computing device. Accordingly, the computer-readable media 604 may be computer-readable media able to store and maintain instructions, modules or components executable by the processor 602.

The computer-readable media 604 may be used to store any number of functional components that are executable by the processor 602. In some implementations, these functional components comprise instructions or programs that are executable by the processor 602 and that, when executed, implement operational logic for performing the actions attributed above to the electronic device 110. Functional components of the electronic device 110 stored in the computer-readable media 604 may include the presentation module 416, the content parser 418 and one or more applications 410, as discussed above. In some instances, the one or more applications 410 may include a web browser, a mobile application, or other module or computer program for accessing and interacting with one or more modules of the content provider 402 to access or receive formatted content items 128 from the content provider site 406, such as by downloading through the network 404.

Other functional components may include an operating system and user interface module 606 for controlling and managing various functions of the electronic device 110. Depending on the type of the electronic device 110, the computer-readable media 604 may also optionally include other functional components, such as other modules 608, which may include applications, programs, drivers and so forth.

The computer-readable media 604 may also store data, data structures, and the like, that are used by the functional components. For example, data stored by the computer-readable media 604 may include the one or more formatted content items 128. The electronic device 110 may also maintain other data, which may include, for example, data used by the applications 410, data used by the operating system and user interface module 606, and data used by the other modules 608. Further, the electronic device 110 may include many other logical, programmatic and physical components, of which those described are merely examples that are related to the discussion herein.

FIG. 6 further illustrates the display 302, which may be passive, emissive or any other form of display. In one implementation, the display uses electronic paper (ePaper) display technology, which is bi-stable, meaning that it is capable of holding text or other rendered images even when very little or no power is supplied to the display. Some examples of suitable ePaper displays that may be used with the implementations described herein include bi-stable LCDs, MEMS, cholesteric, pigmented electrophoretic, and others. In other implementations, or for other types of devices, the display 302 may be an active display such as a liquid crystal display, plasma display, light emitting diode display, organic light emitting diode display, and so forth. These displays may comprise drive electronics, such as a display drive matrix configured to affect individual pixels within the display 302.

One or more communication interfaces 610 may support both wired and wireless connection to various networks, such as cellular networks, radio, WiFi networks, short-range or near-field networks (e.g., Bluetooth®), infrared signals, local area networks, wide area networks, the Internet, and so forth, any combination of which may be included in the networks 404. For example, the communication interface 610 may allow a user of the electronic device 110 to access the World Wide Web, download content items from the content provider site 406, access online content, such as from a website or other network location, and the like. The communication interface 610 may further allow a user to access storage on another device, such as a user's computing device, a network attached storage device, cloud storage, or the like.

The electronic device 110 may further be equipped with various other input/output (I/O) components 612. Such I/O components 612 may include a touchscreen and various user controls (e.g., buttons, a joystick, a keyboard, a mouse, etc.), speakers, a microphone, a camera, connection ports, and so forth. For example, the operating system 606 of the electronic device 110 may include suitable drivers configured to accept input from a keypad, keyboard, or other user controls and devices included as the I/O components 612. For instance, the user controls may include page turning buttons, navigational keys, a power on/off button, selection keys, and so on. Additionally, the electronic device 110 may include various other components that are not shown, examples of which include removable storage, a power source, such as a battery and power control unit, a global positioning system (GPS) device, a PC Card component, and so forth.

Figure 7:
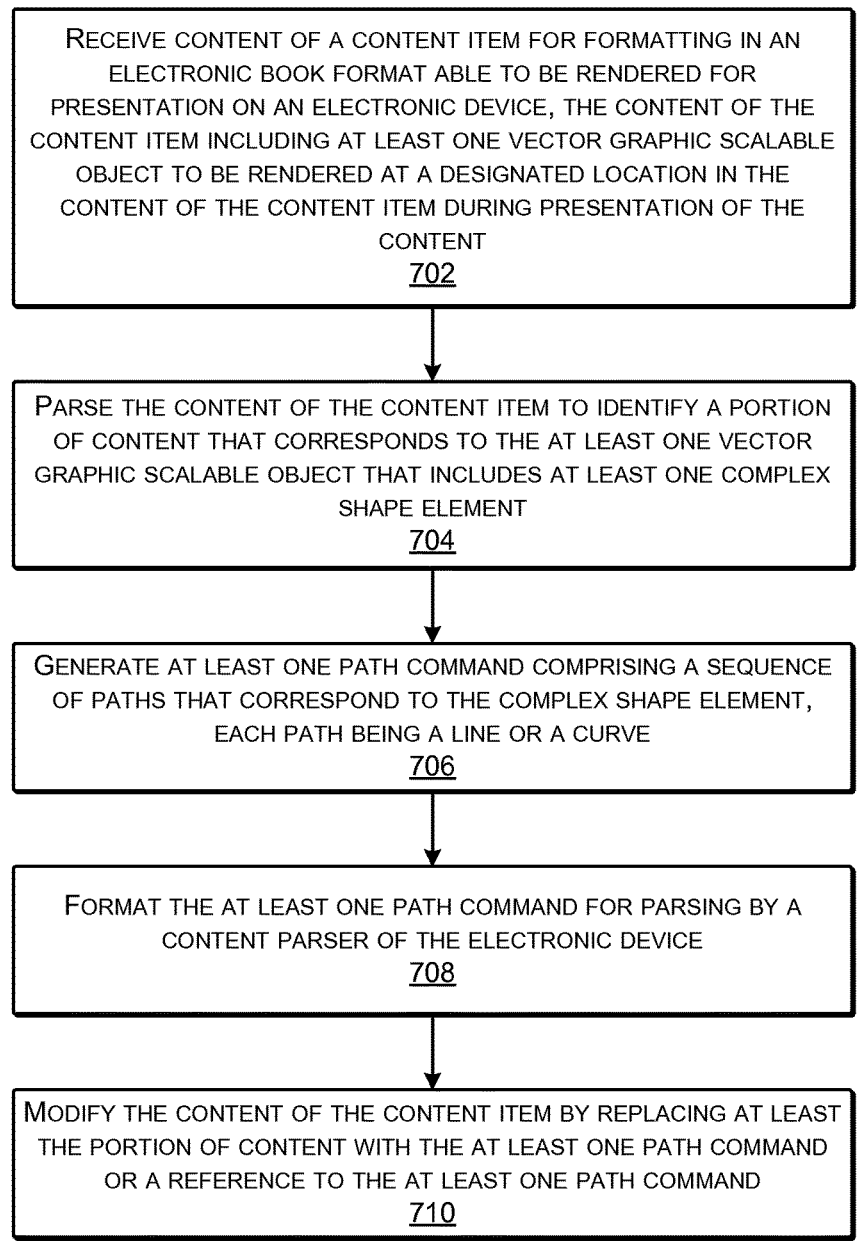
FIG. 7 is a flow diagram illustrating an example process for formatting a content item to have a scalable object expressed using micro rendering commands according to some implementations.
Figure 8:
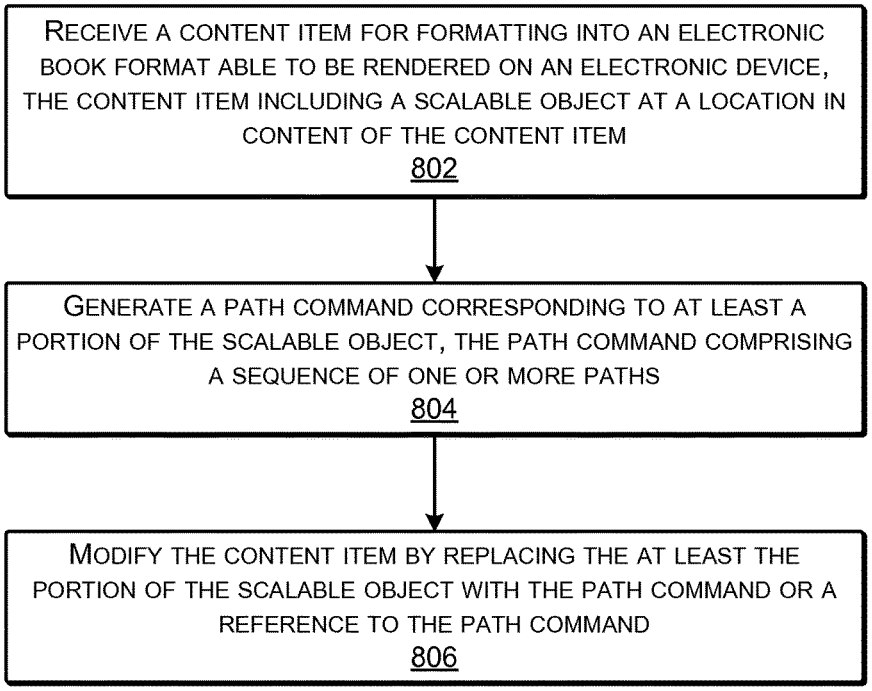
FIG. 8 is a flow diagram illustrating an example process for preparing a content item to have a scalable object expressed using micro rendering commands according to some implementations.

FIGS. 7-8 are flow diagrams illustrating example processes for formatting a content item to have a scalable object expressed as micro rendering commands according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 7 is a flow diagram illustrating an example process 700 for formatting a content item to have a scalable object expressed as micro rendering commands according to some implementations. The process 700 may be performed by a computing device, such as one or more computing devices of a content provider or other entity.

At 702, the computing device may receive content of a content item for formatting in an electronic book format able to be rendered for presentation on an electronic device. The content of the content item may include at least one vector graphic scalable object to be rendered at a designated location in the content of the content item during presentation of the content. For example, the content item may be an electronic book and the vector graphic scalable object may be an SVG object, a MathML object, or other type of vector graphic object that will be rendered with the content of the content item.

At 704, the computing device may parse the content of the content item to identify a portion of content that corresponds to the at least one vector graphic scalable object that includes at least one complex shape element. For instance, the computing device may identify code, such as XML (extensible markup language) code, that corresponds to the at least one vector graphic scalable object. For example, the computing device may recognize particular words, phrases, or the like, that indicate the presence of a scalable object in the content of the content item.

At 706, the computing device may generate at least one path command comprising a sequence of paths that correspond to the complex shape element, each path being a line or a curve. For instance, the computing device may convert a complex shape element in the XML code to at least one path command comprising a sequence of paths that correspond to the complex shape element. For example, each path may be a line or a curve corresponding to at least a portion of the complex shape element. Examples of complex shape elements include rectangles, circles, ellipses, polygons, polylines, and so forth, as enumerated above.

At 708, the computing device may format the at least one path command for parsing by a content parser on the electronic device. For example, the computing device may apply an SVG converter, such as Libsvgtiny, for formatting the path commands into a format that may be parsed using a content parser on an electronic device.

At 710, the computing device may modify the content of the content item by replacing at least the portion of content with the at least one path command or a reference to the at least one path command. For example, the computing device may format the content of the content item into the electronic book format. Further, the computing device may format the other content, such as text and raster images into one or more desired electronic book formats able to be rendered on the electronic device. In addition, the computing device may associate the at least one path command with the designated location in the formatted content of the content item in place of the XML code. For example, the computing device may insert the at least one path command into the content of the content item to be rendered with the content of the content item. Alternatively, the computing device may insert into the content a link or other reference to a metadata file that includes the at least one path command.

FIG. 8 is a flow diagram illustrating an example process 800 for formatting a content item to have a scalable object expressed using micro rendering commands according to some implementations. The process 800 may be performed by a computing device, such as one or more computing devices of a content provider or other entity.

At 802, the computing device receives a content item for formatting into an electronic book format able to be rendered on an electronic device, the content item including a scalable object at a location in content of the content item. For example, content item may be received from a source of content items, such as a publisher, author or a library of a content provider.

At 804, the computing device may generate a path command corresponding to at least a portion of the scalable object, the path command comprising a sequence of one or more paths that correspond to at least the portion of the scalable object. For example, the computing device may use a vector graphics simplifier, such as a vector graphics editor or other suitable software, for reducing complex shape commands into simple micro rendering commands such as a path command corresponding to a complex shape.

At 806, the computing device may modify the content item by replacing the at least the portion of the scalable object with the path command or a reference to the path command. As one example, the computing device may associate the path command with the location in the content to replace object rendering information for the scalable object received with the content item. For example, the computing device may insert the at least one path command into the content of the content item to be rendered with the content of the content item. Alternatively, the computing device may insert into the content a link or other reference to a metadata file that includes the at least one path command.

Additionally, the example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
one or more processors;
one or more computer-readable media maintaining instructions that are executable by the one or more processors to:
receive a first version of content of an electronic book, wherein the first version is in a first format that includes at least one text item, at least one raster graphics item, and at least one vector graphic scalable object to be rendered, during presentation of the content, by a first device type;
parse the first version to identify a section of the content that corresponds to the at least one vector graphic scalable object, the at least one text item, and the at least one raster graphics item, wherein the at least one vector graphic scalable object comprises a complex shape element having a plurality of portions;
format the at least one text item and the at least one raster graphics item to be compatible with a second device type that is different than the first device type;
simplify the at least one vector graphic scalable object to produce simplified path data based on at least one available rendering command of a plurality of available rendering commands, the simplified path data comprising at least one path command corresponding to a sequence of paths, wherein individual paths of the sequence of paths correspond to individual portions of the plurality of portions of the complex shape element, and wherein the plurality of available rendering commands include at least a draw-linear-Bezier-curve command, a draw-cubic-Bezier-curve command, and a draw-quadratic-Bezier-curve command;
generate a second version of the content in a second format by:
modifying the first version of content by replacing the complex shape element with a reference to the at least one path command, the modifying to enable the at least one vector graphic scalable object to be rendered without the computation of the complex shape element and the reference referring to a location in metadata that includes the at least one path command; and
sending the metadata and the formatted at least one text item to a device of a second device type with the second version of the content.

2. The system as recited in claim 1, the instructions further executable by the one or more processors to associate at least one of a stroke width, a stroke color, or a fill color with the at least one path command.

3. The system as recited in claim 1, wherein the first format is incompatible with the second device type, and wherein the second device type is a client electronic device designed to enable one or more end-users to consume the content of the electronic book.

4. The system as recited in claim 1, wherein the first version of the content includes a dependency on extensible markup language (XML) code, and wherein generating the second version removes the dependency on the XML code from the content.

5. The system as recited in claim 1, wherein at least a first portion of the plurality of portions of the complex shape element is contiguous with at least a second portion of the plurality of portions of the complex shape element.

6. A method comprising:
under control of one or more processors configured with executable instructions,
receiving a content item that includes a text content item and a vector graphic scalable object to be rendered based on a computation of at least one complex shape element, the at least one complex shape element including a plurality of portions;
formatting the text content item to be compatible with an electronic book reader device;
simplifying the at least one vector graphic scalable object to produce simplified path data based on at least one available rendering command of a plurality of available rendering commands, the simplified path data comprising at least one path command corresponding to a sequence of paths, wherein individual paths of the sequence of paths correspond to individual portions of the plurality of portions of the complex shape element;
replacing the at least one complex shape element with a reference to the at least one path command, the modifying to enable the vector graphic scalable object to be rendered without the computation of the at least one complex shape element and the reference referring to a location in metadata that includes the at least one path command; and
sending the metadata and the formatted text content item to the electronic book reader device with the content item.

7. The method as recited in claim 6, further comprising sending the at least one path command to the electronic book reader device.

8. The method as recited in claim 6, wherein the vector graphic scalable object represents the at least one complex shape element and the at least one path command includes a parametric curve that corresponds to the at least one complex shape element.

9. The method as recited in claim 6, wherein the vector graphic scalable object is a MathML (mathematical markup language) object and wherein generating the at least one path command comprises converting the MathML object to the vector graphic scalable object.

10. The method as recited in claim 6, wherein the at least one path command is inserted into content of the content item in place of a complex shape element command.

11. The method as recited in claim 6, wherein the vector graphic scalable object includes at least one of:
   an equation;
   a diagram; or
   a chart.

12. One or more non-transitory computer-readable media maintaining instructions that, when executed by one or more processors of a computing device, cause the one or more processors to perform operations comprising:
   receiving a content item that includes a raster graphics item and a vector graphic scalable object to be rendered during presentation of the content item, wherein the vector graphic scalable object includes at least one complex shape element having a plurality of portions;
   formatting the raster graphics item to be compatible with an electronic book reader device;
   simplifying the at least one vector graphic scalable object to produce simplified path data based on at least one available rendering command of a plurality of available rendering commands, the simplified path data comprising at least one path command corresponding to a sequence of paths, wherein individual paths of the sequence of paths correspond to individual portions of the plurality of portions of the complex shape element;
   replacing the at least one complex shape element with a reference to the at least one path command, the reference referring to a location in metadata that includes the at least one path command; and
   sending the metadata and the formatted raster graphics item to the electronic book reader device with the content item.

13. The one or more non-transitory computer-readable media as recited in claim 12, wherein:
   the content item is an electronic book; and
   the vector graph scalable object is to be rendered during presentation of the content item on the electronic book reader device.

14. The one or more non-transitory computer-readable media as recited in claim 12, wherein the at least one path command include at least one of:
   a command to draw a line;
   a command to draw a curve; or
   a command to close a path.

15. The one or more non-transitory computer-readable media as recited in claim 12, the operations further comprising associating at least one of a stroke width, a stroke color, or a fill color with the at least one path command.

16. The one or more non-transitory computer-readable media as recited in claim 12, wherein the at least one complex shape element comprises at least one of:
   a circle element;
   a rectangle element;
   an ellipse element;
   a polyline element;
   a polygon element;
   a 3D cube element;
   an arc element;
   or a gradient element.

17. The one or more non-transitory computer-readable media as recited in claim 12, wherein the vector graphic scalable object is in a format other than MathML.

* * * * *